United States Patent [19]

von Kaler et al.

[11] 4,103,566

[45] Aug. 1, 1978

[54] TRANSAXLE

[75] Inventors: Roland L. von Kaler, Tecumseh; Norman E. Jolliff, Tipton, both of Mich.

[73] Assignee: Tecumseh Products Company, Tecumseh, Mich.

[21] Appl. No.: 747,916

[22] Filed: Dec. 6, 1976

[51] Int. Cl.² .................................. F16H 37/08
[52] U.S. Cl. ........................................ 74/701
[58] Field of Search .................. 74/694, 700, 701

[56] References Cited

U.S. PATENT DOCUMENTS

| 2,867,135 | 1/1959 | Schiller | 74/700 |
| 2,306,545 | 12/1942 | Kummich | 74/701 |
| 2,807,340 | 9/1957 | Butterworth | 74/701 X |
| 2,808,738 | 10/1957 | Bartell | 74/701 |
| 3,017,787 | 1/1962 | Payne | 74/700 X |
| 3,099,165 | 7/1963 | Heth et al. | 74/701 X |

Primary Examiner—Samuel Scott
Assistant Examiner—Lance W. Chandler
Attorney, Agent, or Firm—Albert L. Jeffers; Roger M. Rickert

[57] ABSTRACT

A transaxle, especially for use with small tractors and riding mowers and the like, which provides a plurality of forward speeds and at least one reverse speed and is, furthermore, provided with a transmission portion and a differential portion integrally combined in a single die cast aluminum housing and interposed between the wheels to be driven.

6 Claims, 3 Drawing Figures

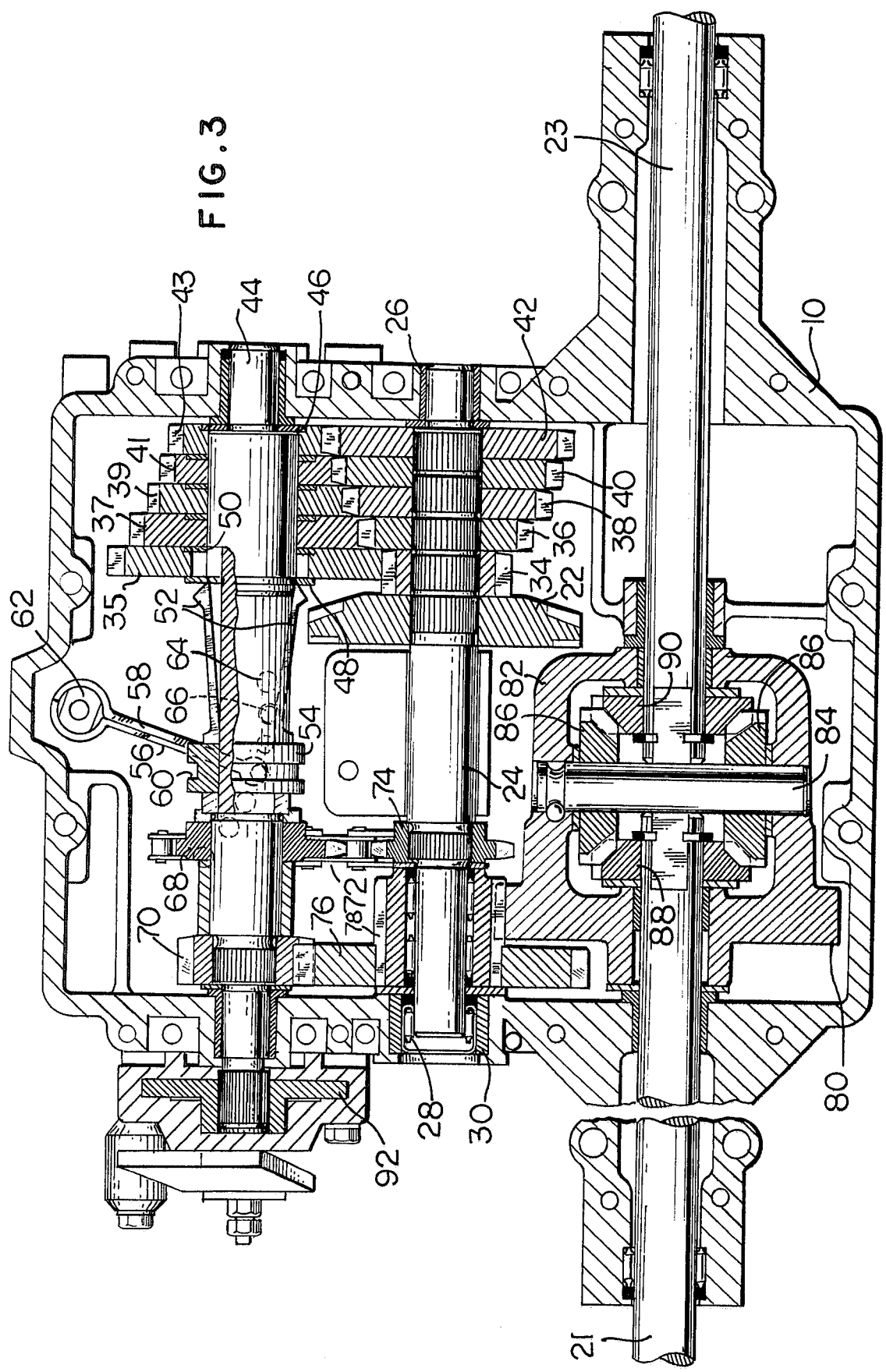

TRANSAXLE

RELATED PATENTS

U.S. Pat. No. 3,812,735 issued to Roland L. von Kaler, et al, for TRANSMISSION, and assigned to the same assignee as the present application. The patent shows a transmission similar to the transmission portion of the present application but lacks an integral differential.

The present invention relates to a combined transmission and differential forming a transaxle and especially adapted for use with small tractors, riding lawn mowers, and like equipment.

In U.S. Pat. No. 3,812,735 there is shown a transmission which provides a plurality of forward speeds and a reverse speed, and which is adapted for incorporation in small equipment, such as riding lawn mowers, and the like.

The present invention represents a further advance in the art over what is disclosed in the aforementioned patent and extends the range of application of a transmission of the nature referred to and, in particular, by the incorporation of a differential unit therein, converts the transmission to a transaxle so that tractive elements, such as wheels, can be mounted directly on the axles which represent the output elements of the transaxle.

A particular object of the present invention is the provision of a transaxle which combines a transmission and a differential in one die cast housing thus eliminating all machining with respect to the housing.

Another objective of the present invention is the provision of a transaxle which is compact in form and which can be constructed inexpensively.

A still further objective is the provision of a transaxle which is small enough to be incorporated in equipment, such as riding lawn mowers and the like, but is, nevertheless, of adequate capacity to permit it to be employed in small tractors of the nature employed in lawn work, and the like.

BRIEF SUMMARY OF THE INVENTION

According to the present invention, a die cast housing, or case, is provided into which a motor driven input shaft extends and within which housing there is a transmission in the form of a plurality of meshing gear sets which can be made selectively effective to vary the transmission ratio between the input shaft and an intermediate shaft. The intermediate shaft, according to the present invention, is connected via a gear train with the input member of a three member differential, the other two members of which form output members which are fixed to respective output shafts which are rotatably supported in the housing and which project therefrom for receiving ground wheels.

The transmission portion of the transaxle preferably comprises a plurality of gear sets providing for a plurality of forward speeds, for example, five speeds, while a single reverse speed is provided, together with a braking arrangement.

The transmission is shiftable into any of the forward speeds and into the reverse speed, and also has a neutral position, and when shifted into any of the speeds provides for a positive drive connection from the input shaft of the transmission to the input member of the three member differential referred to above. Advantageously, the die cast housing, or case, of the transaxle is formed in two parts, separable along a parting plane.

Preferably, the axes of rotation of the several shafts of the transmission and of the differential unit are in the plane thereby simplifying manufacture, assembly, and servicing of the transaxle.

The exact nature of the present invention and the several objects and advantages thereof will become more apparent upon reference to the following detailed specification taken in connection with the accompanying drawings, in which:

FIG. 3 is a plan sectional view of the transaxle, indicated by line 3—3 on FIG. 1.

DETAILED DESCRIPTION OF THE INVENTION

Figure 1:
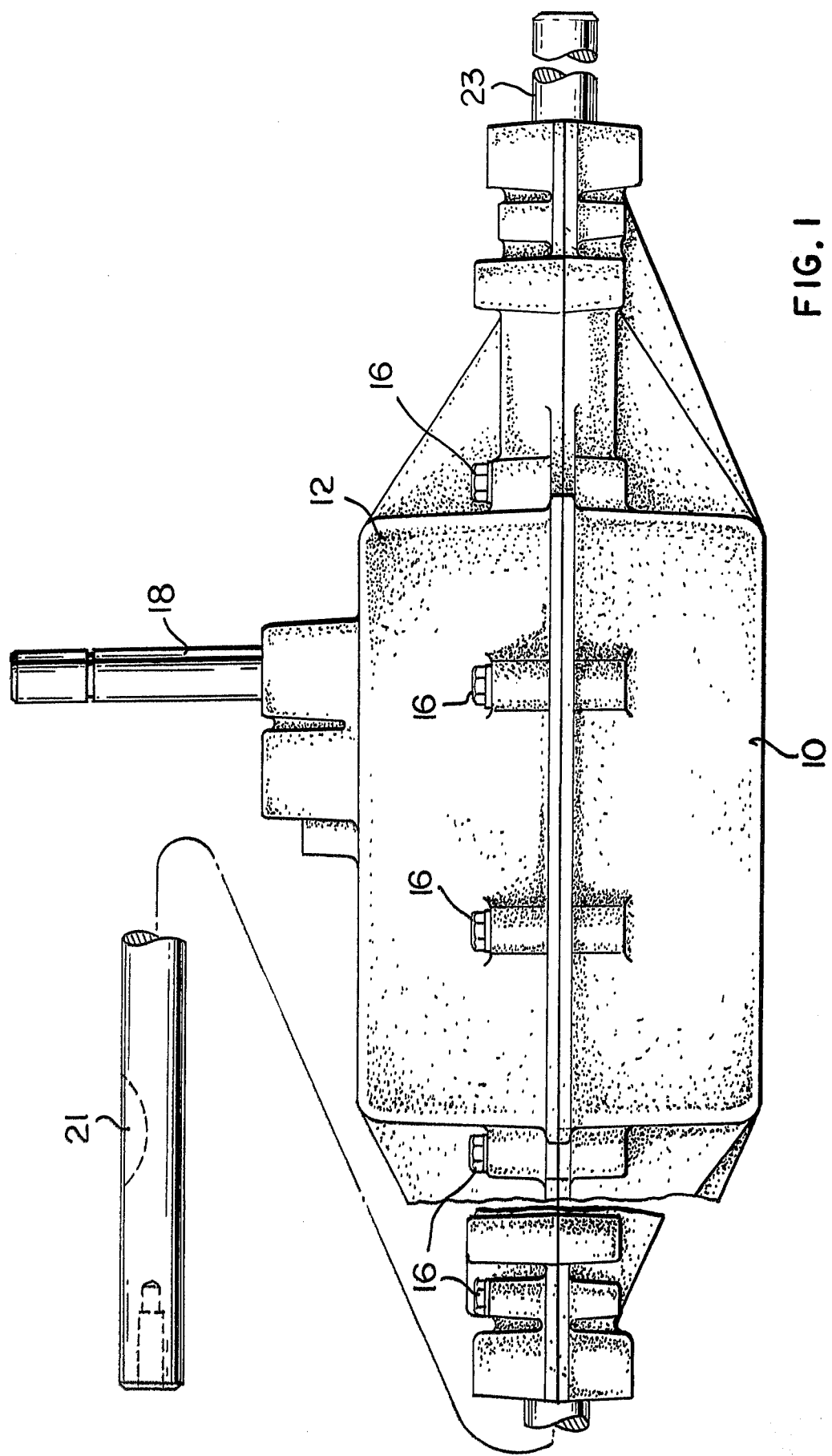
FIG. 1 is an elevational view of a transaxle, constructed according to the present invention.
Figure 2:
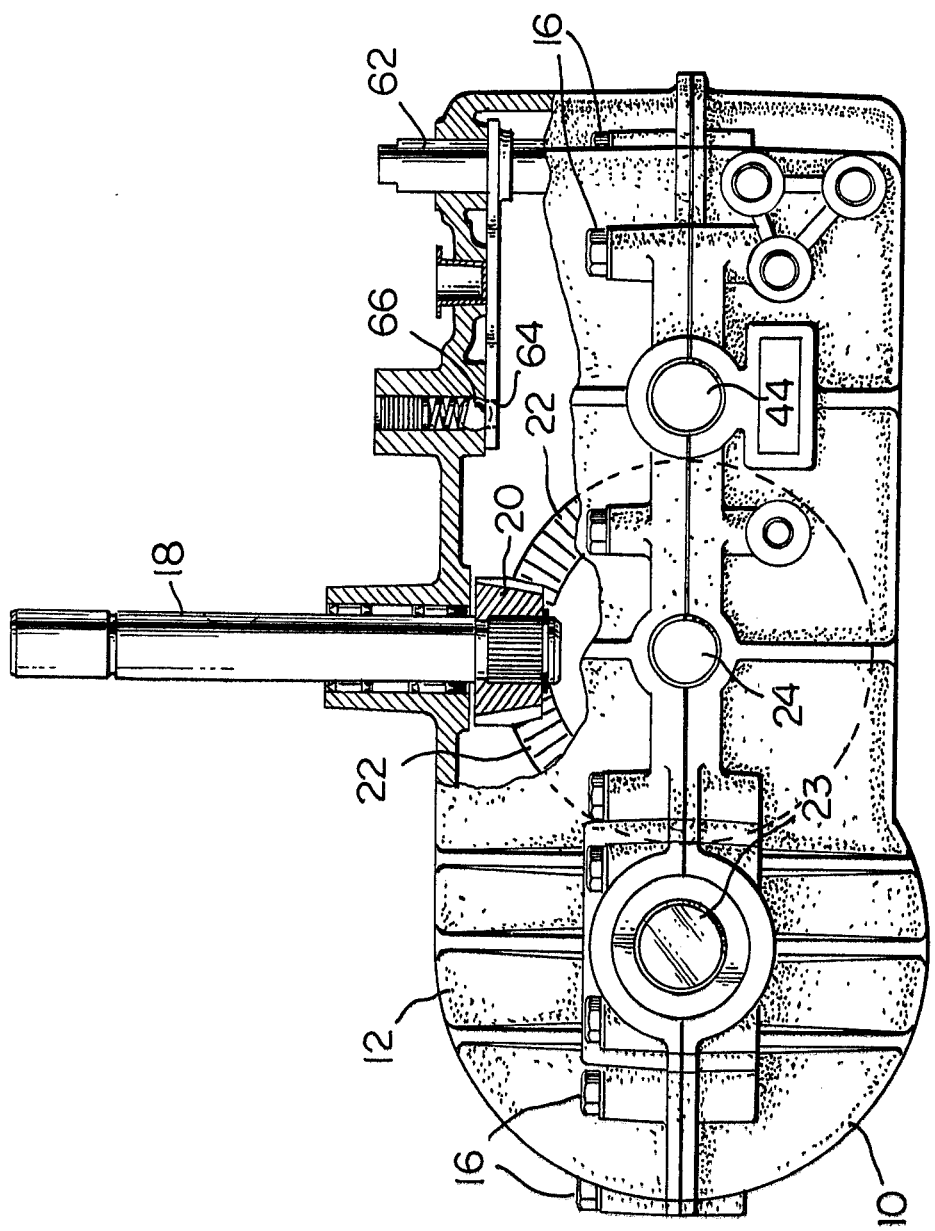
FIG. 2 is a side view of the transaxle looking in from the right side of FIG. 1.

Referring to the drawings somewhat more in detail, the transaxle according to the present invention will be seen, particularly in FIGS. 1 and 2, to comprise a die cast aluminum case, or housing, consisting of a lower part 10 and an upper part 12 resting thereon with the parts being secured together in sealed relation by a plurality of interconnecting bolts 16. An input shaft 18 is provided which extends vertically upwardly above the upper housing part 12 and within the range of the transmission portion of the transaxle and is adapted for receiving a drive pulley or the like for being driven in one direction of rotation.

Extending from opposite sides of the transaxle are the output shafts 21 and 23 (FIG. 3) which are adapted for connection with respective ground wheels, or the like. As will be seen hereinafter, the shafts 21 and 23 are interconnected by way of a differential unit so that the transaxle according to the present invention is readily adapted for use with tractors and riding lawn mowers, and the like, in which relative motion between the driving wheels is important, but without the necessity of providing a separate differential unit externally of and separate from a transmission.

Referring now to FIGS. 2 and 3, it will be seen that input shaft 18 has a pinion 20 thereon within the casing of the transaxle and which pinion 20 meshes with the bevel gear 22 nonrotatably connected to a shaft 24, as by being splined thereto, and the end portions of which are journalled in the casing of the transaxle.

As will be seen in FIG. 3, the right end of shaft 24 is received in a sleeve bearing 26, whereas the left end thereof is received in a needle bearing 28, which is supported in a sleeve 30, being supported in the adjacent wall of the transaxle housing.

Shaft 24, in addition to bevel gear 22, carries spur gears 34, 36, 38, 40 and 42, all nonrotatably connected to shaft 24, as by being splined thereto, and each providing for a respective speed of rotation of output shafts 21 and 23.

Each of gears 34 through 42 meshes with a respective gear 35, 37, 39, 41 and 43, all of which are rotatably supported on a furthur shaft 44 supported in the case of the transaxle in parallel spaced relation to shaft 24. The gears 35, 37, 39, 41 and 43 are retained in adjacent, but relatively rotatable, relation on shaft 44 between retaining discs 46 and 48 and with further discs 50 interposed between adjacent ones of the gears.

The five gears 35, 37, 39, 41 and 43, are adapted for selective driving connection to shaft 44 by shifting mechanism more fully disclosed in U.S. Pat. No.

3,812,735, referred to above. In any case, however, each of the gears are provided with four or more diametrally opposed keyways in the inner periphery thereof which are adapted for engagement by the sliding keys 52 disposed in respective axial slots in shaft 44, and each having an outwardly opening notch toward the left end which is engaged by the annular collar 54 which is shiftable along shaft 44.

When shift collar 54 is moved rightwardly from the position in which it is shown in FIG. 3, the right ends of sliding keys 52 cam under the disc 48 and will engage in notches or keyways formed in gear 35. As the collar 54 moves on toward the right, the sliding keys 52 will successively engage one only of the gears 35, 37, 39, 41 and 43 in each shifted position of the collar as determined by the shifting mechanism connected therewith.

In practice, it is advantageous to mount a shift fork 56, 58 and 62 to engage groove 60 in collar 54, and the other end of the shaft 62 which, as will be seen in FIG. 2, extends to the outside of the case for connection to a shifting device, such as a lever or the like.

Shift fork 56, 58 and 62 has a plurality of recesses 64 therein, each corresponding to a shifted position of shift collar 54 and these recesses, as will be seen in FIG. 2, are engageable by a spring loaded detent ball 66 carried in the case of the transaxle.

Shift lever 58 is shown with the keys 52 disengaged from gears 35, 37, 39, 41 and 43, and with the transmission portion of the transaxle, accordingly, in a neutral position. However, the sliding keys 52 are adapted, at the left ends, for driving engagement with a sprocket 68 which is rotatably mounted on shaft 44. Sprocket 68 is connected by chain 72 with a sprocket 74 nonrotatably mounted on shaft 24.

It will be apparent that whenever shaft 44 is driven by any of the gears 34 to 42, it will rotate in a direction opposite to shaft 24, while driving of shaft 44 by sprocket 68 will cause shaft 44 to rotate in the same direction as shaft 24. There is, thus, provided five forward speeds, neutral, and a reverse speed, for shaft 44.

Output gear 70 on shaft 44 meshes with a gear 76 nonrotatably mounted on a gear 78 so as to form a compound gear therewith, with gear 78 meshing with a ring gear portion 80 formed on input member 82 of a three member differential, the output members of which comprise the shafts 21 and 23.

Member 82 of the differential has a central shaft 84 on which bevel gears 86 are mounted and which mesh with bevel gears 88 and 90 that are nonrotatably connected to respective ones of output shafts 21 and 23.

It is advantageous to provide the transaxle arrangement of the present invention with braking means and this can be accomplished by extending shaft 44 out of the case and nonrotatably mounting thereon a brake rotor, such as is indicated at 92 in FIG. 3. Any suitable braking mechanism can be associated with brake rotor 92.

Modifications may be made within the scope of the appended claims.

What is claimed is:

1. In a transaxle; a housing, a first shaft and an intermediate shaft parallel thereto journalled in said housing, a plurality of sets of meshing gears on said shafts for establishing a plurality of reversing drives at respective ratios between said shafts, a nonreversing drive connecting said shafts, clutch means shiftable to make any one only of said drives effective, and a differential in said housing having an input member, means drivingly connecting said input member to said intermediate shaft, said differential comprising a pair of coaxial output members rotatable on an axis parallel to said shafts, the sets of machine gears on the shafts including first gears nonrotatable on said first shaft and second gears rotatable on said intermediate shaft, said clutch means being slidably supported on said intermediate shaft, said nonreversing drive comprising a first sprocket nonrotatable on the first shaft, a second sprocket rotatable on said intermediate shaft, and a chain entrained about the sprockets, said second sprocket being on the opposite axial side of said clutch means from said second gears, and being engageable by the clutch means only when the clutch means is fully disengaged from said second gears.

2. A transaxle according to claim 1 in which said means drivingly connecting the input member of said differential to said intermediate shaft comprises a first gear on said intermediate shaft, second gear means rotatable on said first shaft and meshing with said first gear, and a third gear on said input member of said differential meshing with said second gear means.

3. A transaxle according to claim 1 in which said output members of said differential comprise bevel gears, an output shaft nonrotatably connected to each bevel gear, a first bearing in the respective end of said input member of the differential for each output shaft, and a second bearing in said housing for each output shaft, the second bearings being spaced outwardly from the first bearings.

4. A transaxle according to claim 3 which includes further bearings for said output shafts spaced outwardly from said second bearings and supported by said housing.

5. The transaxle according to claim 1 further comprising an input shaft extending generally perpendicular to the plane of the first and intermediate shafts, a bevel gear fixedly attached to the input shaft, and a bevel gear fixedly attached to the first shaft and meshing with the input shaft bevel gear to drivingly interconnect the input shaft and first shaft.

6. A transaxle comprising: a housing, a first shaft and an intermediate shaft parallel thereto journalled in said housing, a plurality of sets of meshing gears on said shafts for establishing a plurality of reversing drives at respective ratios between said shafts, a nonreversing drive connecting said shafts, clutch means shiftable to make any one only of said drives effective, a differential in said housing having an input gear member, an intermediate gear rotatable on said first shaft meshing with said input gear member and drivingly connected to a second intermediate gear rotatable on said first shaft, and an output gear nonrotatable on said intermediate shaft meshing with said second intermediate gear, said differential comprising a pair of coaxial output members rotatable on an axis parallel to said shafts, the sets of machine gears on the shafts including first gears nonrotatable on said first shaft and second gears rotatable on said intermediate shaft, said clutch means being slidably supported on said intermediate shaft, said nonreversing drive comprising a first sprocket nonrotatable on the first shaft, a second sprocket rotatable on said intermediate shaft, and a chain entrained about the sprockets, said second sprocket being on the opposite axial side of said clutch means from said second gears, and being engageable by the clutch means only when the clutch means is fully disengaged from said second gears.

* * * * *